(12) United States Patent
Duncan et al.

(10) Patent No.: US 10,686,699 B2
(45) Date of Patent: Jun. 16, 2020

(54) MULTICAST SYSTEMS AND METHODS FOR SEGMENT ROUTING

(71) Applicant: Ciena Corporation, Hanover, MD (US)

(72) Inventors: Ian H. Duncan, Ottawa (CA); Nigel L. Bragg, Cambridge (GB)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/034,495

(22) Filed: Jul. 13, 2018

(65) Prior Publication Data

US 2018/0324090 A1 Nov. 8, 2018

Related U.S. Application Data

(63) Continuation-in-part of application No. 15/203,893, filed on Jul. 7, 2016, now Pat. No. 10,069,639.
(Continued)

(51) Int. Cl.
*H04L 12/18* (2006.01)
*H04L 12/723* (2013.01)
(Continued)

(52) U.S. Cl.
CPC ............. *H04L 45/50* (2013.01); *H04L 12/18* (2013.01); *H04L 12/1854* (2013.01);
(Continued)

(58) Field of Classification Search
CPC . H04L 45/50; H04L 12/1854; H04L 12/4625; H04L 12/4641; H04L 12/66; H04L 12/18
See application file for complete search history.

(56) References Cited

U.S. PATENT DOCUMENTS

| 7,136,357 B2 | 11/2006 | Soumiya et al. |
| 7,161,946 B1 | 1/2007 | Jha |

(Continued)

FOREIGN PATENT DOCUMENTS

WO 2010/056582 A2 5/2010

OTHER PUBLICATIONS

Filsfils, et al., ("Segment Routing with MPLS data plane, draft-ieft-spring-segment-routing-mpls-01", Network Group, Internet —draft, May 29, 2015, 14 pages) (Year: 2015).*
(Continued)

*Primary Examiner* — Lan-Huong Truong
(74) *Attorney, Agent, or Firm* — Clements Bernard Walker; Christopher L. Bernard; Lawrence A. Baratta, Jr.

(57) ABSTRACT

A multicast method for Segment Routing includes, in a Segment Routing network with a plurality of nodes, wherein Segment Routing utilizes globally significant labels as node identifiers such that path state installation is only required at an ingress node of a Segment Routing domain, advertising a multicast flow by a source node; determining roles in the multicast flow for the plurality of nodes; and installing appropriate forwarding behavior for the multicast flow at the plurality of nodes based on the determined roles. The advertising can utilize Interior Gateway Protocol (IGP). For the multicast flow, source node segments are used to construct source routed trees rather than destination-based paths, wherein the source routed trees define broadcast paths, versus destination-based paths which are used in Segment Routing to define a node segment.

19 Claims, 12 Drawing Sheets

Related U.S. Application Data

(60) Provisional application No. 62/197,891, filed on Jul. 28, 2015.

(51) Int. Cl.
*H04L 12/46* (2006.01)
*H04L 12/66* (2006.01)

(52) U.S. Cl.
CPC ...... *H04L 12/4625* (2013.01); *H04L 12/4641* (2013.01); *H04L 12/66* (2013.01)

(56) References Cited

U.S. PATENT DOCUMENTS

| | | | |
|---|---|---|---|
| 7,370,119 B2 | 5/2008 | Provine et al. | |
| 7,463,584 B2 | 12/2008 | Allan et al. | |
| 7,463,639 B1 | 12/2008 | Rekhter | |
| 7,616,637 B1 | 11/2009 | Lee et al. | |
| 8,121,126 B1 | 2/2012 | Moisand et al. | |
| 8,194,554 B2 | 6/2012 | Bragg et al. | |
| 8,223,660 B2 | 7/2012 | Allan et al. | |
| 8,223,668 B2 | 7/2012 | Allan et al. | |
| 8,274,989 B1 | 9/2012 | Allan et al. | |
| 8,693,323 B1 | 4/2014 | McDysan | |
| 8,804,736 B1 | 8/2014 | Drake et al. | |
| 8,953,500 B1* | 2/2015 | Shen | H04L 45/16 370/238 |
| 9,049,233 B2 | 6/2015 | Frost et al. | |
| 9,647,959 B2* | 5/2017 | Hao | H04L 45/16 |
| 2002/0150094 A1* | 10/2002 | Cheng | H04L 12/185 370/389 |
| 2004/0196827 A1 | 10/2004 | Xu et al. | |
| 2004/0213228 A1 | 10/2004 | Regan et al. | |
| 2005/0053071 A1 | 3/2005 | Betts et al. | |
| 2005/0088965 A1 | 4/2005 | Atlas et al. | |
| 2005/0125490 A1 | 6/2005 | Ramia | |
| 2005/0220096 A1 | 10/2005 | Friskney et al. | |
| 2007/0076719 A1 | 4/2007 | Allan et al. | |
| 2007/0086361 A1 | 4/2007 | Allan et al. | |
| 2008/0310417 A1 | 12/2008 | Friskney et al. | |
| 2009/0055529 A1* | 2/2009 | Truong | H04L 43/00 709/224 |
| 2009/0059799 A1 | 3/2009 | Friskney et al. | |
| 2009/0135815 A1 | 5/2009 | Pacella | |
| 2009/0141703 A1 | 6/2009 | Ghodrat et al. | |
| 2009/0161669 A1 | 6/2009 | Bragg et al. | |
| 2009/0168666 A1 | 7/2009 | Unbehagen et al. | |
| 2009/0168780 A1 | 7/2009 | Unbehagen et al. | |
| 2010/0040061 A1 | 2/2010 | McGuire et al. | |
| 2010/0124225 A1 | 5/2010 | Fedyk | |
| 2010/0124231 A1 | 5/2010 | Kompella | |
| 2011/0128857 A1 | 6/2011 | Chiabaut et al. | |
| 2011/0205907 A1 | 8/2011 | Kini et al. | |
| 2011/0292836 A1 | 12/2011 | Bragg et al. | |
| 2012/0069745 A1 | 3/2012 | Kini et al. | |
| 2012/0224579 A1 | 9/2012 | Ashwood-Smith | |
| 2013/0003727 A1 | 1/2013 | Ramaraj et al. | |
| 2013/0336191 A1* | 12/2013 | Zhao | H04L 12/1863 370/312 |
| 2014/0198634 A1 | 7/2014 | Kumar et al. | |
| 2015/0188771 A1* | 7/2015 | Allan | H04L 12/185 370/217 |
| 2015/0195178 A1* | 7/2015 | Bhattacharya | H04L 45/745 718/1 |
| 2015/0312135 A1* | 10/2015 | Moopath Velayudhan | H04L 45/16 370/390 |

OTHER PUBLICATIONS

Hao W., et al, "IGP multicast Architecture", draft-young-rtgwg-igp-multicast-arch-01.txt, IETF, ISOC, Nov. 2014, pp. 1-14 (Year : 2014).*

E. Rosen, A. Viswanathan, R. Callon; MEMO: "Multiprotocol Label Switching Architecture"; Network Working Group; Copyright (C) The Internet Society (Jan. 2001), http://www.ietf.org/rfc/rfc3031.txt.

Y. Rekhter, E. Rosen; MEMO: "Carrying Label Information in BGP-4"; Network Working Group; Copyright (C) The Internet Society (May 2001), http://tools.ietf.org/rfc/rfc3107.txt.

E. Rosen, D. Tappan, G. Fedorkow, Y. Rekhter, D. Farinacci, T. Li, A. Conta; MEMO: "MPLS Label Stack Encoding"; Network Working Group; Copyright (C) The Internet Society (Jan. 2001), http://tools.ietf.org/html/rfc3032.txt.

S. Previdi, et al., "Segment Routing with IS-IS Routing Protocol, draft-previdi-filsfils-isis-segment-routing-02", Mar. 2013, http://www.ietf.org/id/draft-previdi-filsfils-isis-segment-routing-02.txt.

Extended European Search Report, European Patent Application No. 13195810.0, dated Feb. 17, 2014.

C. Filsfils et al., "Segment Routing with MPLS data plane draft-ietf-spring-segment-routing-mpls-03", Feb. 1, 2016, Internet—Draft, Expires Aug. 4, 2016, pp. 1-15.

Previdi, et al., "IPv6 Segment Routing Header (SRH) draft-previdi-6man-segment-routing-header-07", Jul. 20, 2015, Internet—Draft, Expires Jan. 21, 2016, pp. 1-33.

* cited by examiner

———— Even services

— — — — Odd services

MULTICAST SYSTEMS AND METHODS FOR SEGMENT ROUTING

CROSS-REFERENCE TO RELATED APPLICATION(S)

The present patent/application is a continuation-in-part of U.S. patent application Ser. No. 15/203,893, filed Jul. 7, 2016, and entitled "MULTICAST SYSTEMS AND METHODS FOR SEGMENT ROUTING," which claims priority to U.S. Provisional Patent Application No. 62/197,891, filed Jul. 28, 2015, and entitled "MULTICAST SYSTEMS AND METHODS FOR SEGMENT ROUTING," the contents of each are incorporated by reference herein.

FIELD OF THE DISCLOSURE

The present disclosure generally relates to networking systems and methods. More particularly, the present disclosure relates to multicast systems and methods for Segment Routing (SR).

BACKGROUND OF THE DISCLOSURE

Segment Routing (SR) is a technology that implements the Source Routing paradigm. A packet header includes a stack of function identifiers, known as segments, which define an ordered list of functions to be applied to the packet. A segment can represent any instruction, topological or service-based. A segment can have a local semantic to an SR node or global within an SR domain. These functions include, but are not limited to, the forwarding behaviors to be applied successively to the packet, notably destination-based unicast forwarding via a sequence of explicitly enumerated nodes (domain-unique node segments) and links (adjacency segments), and the like. SR allows forcing a flow through any topological path and service chain while maintaining per-flow state only at the ingress node to the SR domain. Segment Routing is described, for example, in Internet Engineering Task Force (IETF) Draft draft-ietf-spring-segment-routing-03, dated May 28, 2015, and entitled "Segment Routing Architecture," the contents of which are incorporated by reference herein. A particular attraction of Segment Routing is that it obviates the need to install and maintain any end-to-end (e2e) path state in the core network. Only the ingress node for a particular flow needs to hold the segment stack which is applied as the header of every packet of that flow, to define its route through the network. This makes Segment Routing particularly suited to control by a Software Defined Networking (SDN) model.

Segment Routing can be directly applied to Multiprotocol Label Switching (MPLS) with no change in the forwarding plane. A segment is encoded as a MPLS label. An ordered list of segments is encoded as a stack of labels. The segment to process is on the top of the stack. Upon completion of a segment, the related label is popped from the stack. Segment Routing can also be applied to the Internet Protocol (IP) v6 architecture, with a new type of routing extension header—for example, the document published July 2015 as draft-previdi-6man-segment-routing-header (available online at tools.ietforg/html/draft-previdi-6man-segment-routing-header-07). A segment is encoded as an IPv6 address. An ordered list of segments is encoded as an ordered list of IPv6 addresses in the routing extension header. The segment to process at any point along the path through the network is indicated by a pointer in the routing extension header. Upon completion of a segment, the pointer is incremented. Segment Routing can also be applied to Ethernet, e.g., IEEE 802.1 and variants thereof. There are various benefits asserted for SR including, for example, scalable end-to-end policy, easy incorporation in IP and Software Defined Networking (SDN) architectures, operational simplicity, a balance between distributed intelligence, centralized optimization and application-based policy creation, and the like.

Segment Routing is currently only defined for unicast. Segment Routing specifications have explicitly excluded support for native multicast forwarding. Multicast forwarding is valuable for supporting many client services, and especially for supporting client Ethernet services overlaid on MPLS transport [e.g., Virtual Private LAN Services (VPLS), Ethernet Virtual Private Network (EVPN)]. Established IP multicast techniques, such as Protocol Independent Multicast, use signaling over a converged unicast topology to construct multicast trees, but these result in poor restoration performance. Also, the signaling model sits uncomfortably with the SDN control paradigm of Segment Routing. Techniques for multicast in emerging technologies such as Shortest Path Bridging are only applicable to Ethernet. Another emerging technology from the IETF, Bit Indexed Explicit Replication (BIER), requires a completely new data path additional to IP, or to MPLS, or to Segment Routing—it requires a greenfield model. Further, it has very visible scaling thresholds.

Thus, there is a need for multicast systems and methods for Segment Routing, which preserves the advantages inherent therein, avoids signaling, provides optimization, and the like.

BRIEF SUMMARY OF THE DISCLOSURE

In an embodiment, a multicast method for Segment Routing includes, in a Segment Routing network with a plurality of nodes, wherein Segment Routing utilizes globally significant labels as node identifiers such that path state installation is only required at an ingress node of a Segment Routing domain, advertising a multicast flow by a source node; determining roles in the multicast flow for the plurality of nodes; and installing appropriate forwarding behavior for the multicast flow at the plurality of nodes based on the determined roles. The advertising can utilize Interior Gateway Protocol (IGP). For the multicast flow, source node segments are used to construct source routed trees rather than destination-based paths, wherein the source routed trees define broadcast paths, versus destination-based paths which are used in Segment Routing to define a node segment. The multicast flow can be assigned a Segment Identifier (SID). The determined roles can be one of a branch point for replication, a root, and a leaf. At the branch point, the appropriate forwarding behavior can include installation of labels for multiple egress ports associated with the multicast flow. The multicast flow can be a tree with a root at the source node, and the method can further include pruning the tree to deliver a flow-specific multicast tree.

In another embodiment, a Segment Routing network includes a plurality of nodes interconnected to one another, wherein Segment Routing utilizes globally significant labels as node identifiers such that path state installation is only required at an ingress node of a Segment Routing domain; wherein a multicast flow is advertised by a source node, and wherein each of the plurality of nodes is configured to determine its role in the multicast based on the advertisement and to install appropriate forwarding behavior for the multicast flow based on a determined role. The advertisement can utilize Interior Gateway Protocol (IGP). For the multicast flow, source node segments are used to construct source routed trees rather than destination-based paths, wherein the source routed trees define broadcast paths, versus destination-based paths which are used in Segment Routing to define a node segment. The multicast flow can be assigned a Segment Identifier (SID). The determined roles can be one of a branch point for replication, a root, and a leaf. At the branch point, the appropriate forwarding behavior can include installation of labels for multiple egress ports associated with the multicast flow. The multicast flow can be a tree with a root at the source node, and wherein the tree is pruned to deliver a flow-specific multicast tree.

In a further embodiment, a node in Segment Routing network includes one or more ports; forwarding circuitry communicatively coupled to the one or more ports; and control circuitry communicatively coupled to the one or more ports and the forwarding circuitry, wherein Segment Routing utilizes globally significant labels as node identifiers such that path state installation is only required at an ingress node of a Segment Routing domain; wherein a multicast flow is advertised by a source node, and wherein the control circuitry is configured to determine the node's role in the multicast based on the advertisement and to install appropriate forwarding behavior for the multicast flow based on a determined role. The advertisement can utilize Interior Gateway Protocol (IGP). For the multicast flow, source node segments are used to construct source routed trees rather than destination-based paths, wherein the source routed trees define broadcast paths, versus destination-based paths which are used in Segment Routing to define a node segment. The multicast flow can be assigned a Segment Identifier (SID). The determined roles can be one of a branch point for replication, a root, and a leaf. The multicast flow can be a tree with a root at the source node, and wherein the tree is pruned to deliver a flow-specific multicast tree.

In an embodiment, a multicast method for Segment Routing receiving, at a node, a multicast packet including an outer label including a Multiprotocol Label Switching (MPLS) source node identifier defining a source-rooted broadcast tree and an inner label including a service identifier defining a service specific multicast tree; responsive to the node including a branch point on the source-rooted broadcast tree, popping the outer label, analyzing the inner label to identify active egress ports, pushing back the outer label, and forwarding the multicast packet to the active egress ports; and, responsive to the node including point-to-point transit for the source-rooted broadcast tree, forwarding the multicast packet on the source-rooted broadcast tree. The outer label can be a globally unique label within the Segment Routing and Interior Gateway Protocol (IGP) domain that identifies a specific router, and wherein the inner label can be a globally unique identifier specifying nodal endpoints of an individual multicast tree. The multicast method can further include assigning and advertising source node segments for the outer label utilizing Interior Gateway Protocol (IGP).

The multicast method can further include, responsive to assigning and advertising source node segments for the outer label, constructing a plurality of source-rooted broadcast trees with different routes. The plurality of source-rooted broadcast trees can be constructed based on an all-pairs Shortest Path First (SPF) computation where the node computes the SPF for every node in a network such that the node computes its own source-rooted broadcast tree as well as its position on a source-rooted broadcast tree for every other node in the network. The all-pairs Shortest Path First (SPF) computation of a source-rooted broadcast tree can utilize a same tie-breaking procedure for equal cost paths for every node in a network. The same tie-breaking procedure can include ranking equal cost paths based on a number of reachable service end-points on each path.

The source-rooted broadcast tree can be divided into a plurality of mutually exclusive subset trees with each subset rooted on a different intermediate node, and wherein the forwarding for each of the plurality of mutually exclusive subset trees can include pushing, at a source node, an outer label including a Segment Routing destination label corresponding to a different intermediate node on top of the MPLS source node identifier; forwarding the multicast packet to the different intermediate node based on the outer destination label; and popping, at the different intermediate node, the outer label and forwarding the multicast packet on a subset tree rooted on the different intermediate node. The multicast method can further include pruning the source-rooted broadcast tree to provide scoped multicast having a granularity of one or more of a flow and a composite tree. The source-rooted broadcast tree can be an inverse of a shortest path routed destination tree.

In another embodiment, an apparatus for multicast in Segment Routing includes circuitry adapted to receive, at a node, a multicast packet including an outer label including a Multiprotocol Label Switching (MPLS) source node identifier defining a source-rooted broadcast tree and an inner label including a service identifier defining a service specific multicast tree; circuitry adapted to pop the outer label, to analyze the inner label to identify active egress ports, pushing back the outer label, and circuitry adapted to forward the multicast packet to the active egress ports, responsive to the node including a branch point on the source-rooted broadcast tree; and circuitry adapted to forward the multicast packet on the source-rooted broadcast tree, responsive to the node including point-to-point transit for the source-rooted broadcast tree. The outer label can be a globally unique label within the Segment Routing and Interior Gateway Protocol (IGP) domain that identifies a specific router, and wherein the inner label can be a globally unique identifier specifying nodal endpoints of an individual multicast tree.

The apparatus can further include circuitry adapted to assign and advertise source node segments for the outer label utilizing Interior Gateway Protocol (IGP). The apparatus can further include circuitry adapted to construct a plurality of source-rooted broadcast trees with different routes responsive to assigning and advertising source node segments for the outer label. The plurality of source-rooted broadcast trees can be constructed based on an all-pairs Shortest Path First (SPF) computation where the node computes the SPF for every node in a network such that the node computes its own source-rooted broadcast tree as well as its position on a source-rooted broadcast tree for every other node in the network. The all-pairs Shortest Path First (SPF) computation can utilize a same tie-breaking procedure for equal cost paths for every node in a network.

The apparatus can further include circuitry adapted to prune the source-rooted broadcast tree to provide scoped multicast having a granularity of one or more of a flow and a composite tree. The source-rooted broadcast tree can be an inverse of a shortest path routed destination tree. The source-rooted broadcast tree can be divided into a plurality of mutually exclusive subset trees with each subset rooted on a different intermediate node, and wherein, to forward relative to each of the plurality of mutually exclusive subset trees, the apparatus can further include circuitry adapted to push, at a source node, an outer label including a Segment Routing destination label corresponding to a different intermediate node on top of the MPLS source node identifier; circuitry adapted to forward the multicast packet to the different intermediate node based on the outer destination label; and circuitry adapted pop, at the different intermediate node, the outer label and forward the multicast packet on a subset tree rooted on the different intermediate node.

In a further embodiment, a Segment Routing network with multicast support therein includes a plurality of nodes interconnected to one another; wherein, for a multicast packet, each node is adapted to receive, at a node, the multicast packet including an outer label including a Multiprotocol Label Switching (MPLS) source node identifier defining a source-rooted broadcast tree and an inner label including a service identifier defining a service specific multicast tree; responsive to the node including a branch point on the source-rooted broadcast tree, pop the outer label, analyze the inner label to identify active egress ports, push back the outer label, and forward the multicast packet to the active egress ports; and, responsive to the node including point-to-point transit for the source-rooted broadcast tree, forward the multicast packet on the source-rooted broadcast tree.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
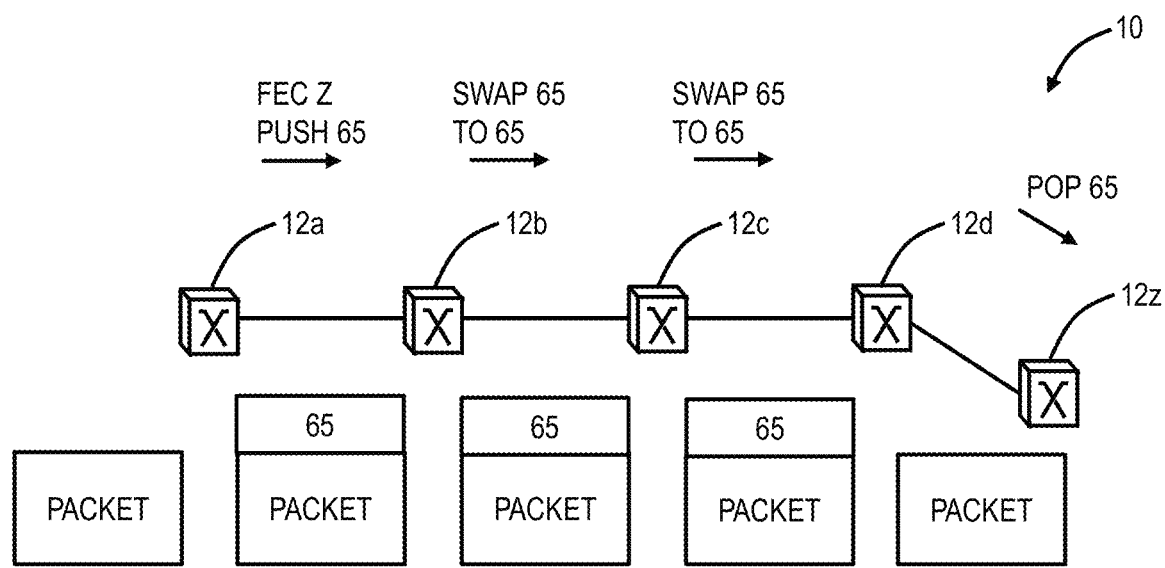
FIGS. 1-4 are network diagrams of Segment Routing through a network.

In various embodiments, multicast systems and methods are described for Segment Routing. Again, Segment Routing is standardized within the IETF and uses globally significant MPLS labels as node identifiers in such a way as to require path state installation only at the ingress node in a Segment Routing domain. Thus, Segment Routing is extremely amenable to SDN control. Again, multicast for Segment Routing is explicitly stated outside the scope of the IETF activities.

The multicast systems and methods described herein aim to address this deficiency. The multicast systems and methods observe that the use of a source node segment type enables the extension of the source routing paradigm to define the shortest path routed broadcast trees, essentially the inverse of the shortest path routed destination-based trees.

To support multicast in Segment Routing, the systems and methods instantiate multiple forwarding planes, each plane defining a broadcast tree-set specified by a different algorithm, and the pruning of any broadcast tree using the second label to define each unique multicast tree required. Conventionally, Segment Routing operates using a label which defines the destination, i.e., for traditional unicast services. To support multicast services in Segment Routing, the systems and methods utilize a two-label hierarchy of identifiers which is entirely compatible with Segment Routing. The two-label hierarchy includes an outer MPLS source-node-identifier label which defines a source-rooted broadcast tree and an inner service-identifier label which defines a service specific multicast tree. Each node which can receive a multicast packet can perform a computation in place to compute a tree based on the two-label hierarchy, which can be used for multicast routing of the packet. While this approach increases per node computation because of its use of in-place computation, it eliminates the need for hop by hop signaling to create multicast trees, enabling the use of simplified control plane techniques such as Intermediate System-Intermediate System (IS-IS), whilst maintaining compatibility with the MPLS data path and Segment Routing's use of labels.

Refinements described herein cover the instantiation of multiple broadcast trees per source node, for load spreading over diverse routes. Also described is a technique for pruning the broadcast tree primitives to deliver scoped multicast functionality, where the scope can be at the granularity of a single user service, but can also be held at the level of a composite tree, providing a superset of connectivity which supports multiple user services.

Segment Routing Overview

Referring to FIGS. 1-4, in various embodiments, network diagrams illustrate Segment Routing through a network 10. The network 10 includes nodes 12a, 12b, 12c, 12d, 12m, 12n, 12o, 12p, 12z. Segment Routing (SR) enables any node to select any path (explicit or derived from the Interior Gateway Protocol's (IGP) destination-based Shortest Path Tree (SPT) computations) for each flow. The path does not depend on a hop-by-hop signaling technique (neither Label Distribution Protocol (LDP) nor Resource Reservation Protocol (RSVP)). It only depends on a set of "segments" that are advertised by the IS-IS routing protocol. These segments act as topological sub-paths that can be combined together to form the desired path.

Figure 2:
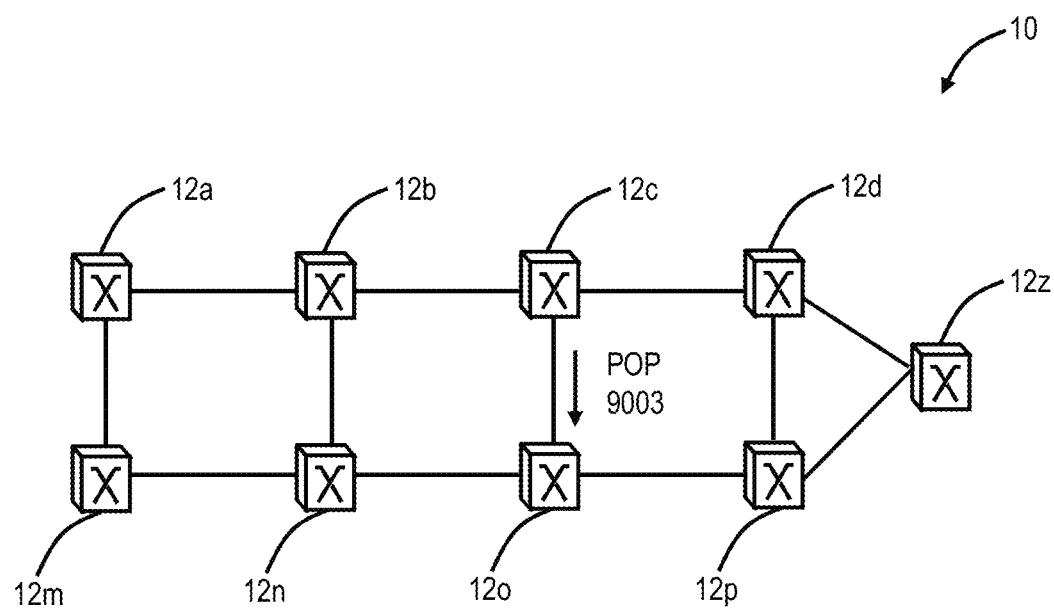

There are two fundamental forms of segments in Segment Routing: node and adjacency. FIG. 1 illustrates the network 10 showing a node segment between the nodes 12a, 12b, 12c, 12d, 12z. A node segment represents the shortest path to a node. A node segment is typically a multi-hop shortest path. In FIG. 1, a packet is being sent to the node 12z, i.e. a Forward Equivalency Class (FEC) Z, and a packet injected anywhere with a top label of "65" will reach the node 12z via the shortest path. In FIG. 1, Penultimate hop popping (PHP) is enabled on the final link. FIG. 2 illustrates the network 10 showing an adjacency segment between the nodes 12c, 12o. An adjacency segment represents a specific adjacency to a node. For example, the node 12c allocates a local label, e.g. "9003", the node 12c advertises the adjacency label "9003" in IS-IS, e.g. via a simple sub-Type Length Value (TLV)

extension, and the node 12c is the only node to install the adjacency segment in its forwarding table for use by the data plane. Thus, a packet injected at the node 12c with a label "9003" is forced through the link between the nodes 12c, 12o. The adjacency segment can be used when laying down Traffic Engineering trunks.

Figure 3:
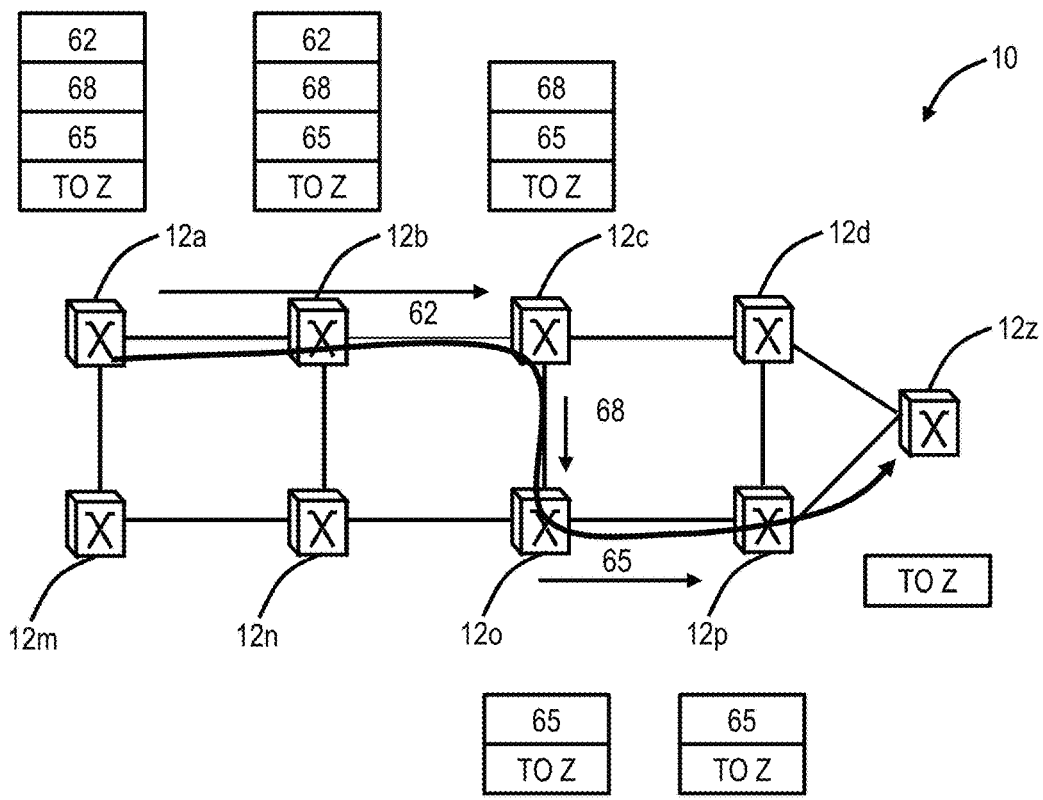

FIG. 3 illustrates the network 10 showing a combination of node segments and adjacency segments for combined segments. Segment Routing uses node segments primarily with adjacency segments used for traffic engineering. In FIG. 3, a packet destined for the node 12z is injected at the node 12a, labels are added at the node 12a as "65" for a node segment to the node 12z, "68" for an adjacency segment between the nodes 12c, 12o, and "62" for a node segment to the node 12c. The label stacks shown in FIG. 3 represent the stack transmitted on the egress port of the associated switch. At the node 12c, the label "62" is popped (assuming Penultimate Hop Popping is disabled) and the label "68" is seen, so the packet takes the adjacency segment between the nodes 12c, 12o. At the node 12o, the label "68" is popped and the label "65" is seen for the node segment to the node 12z. At the node 12z, the label "65" is popped revealing the packet destined for the node 12z.

Figure 4:
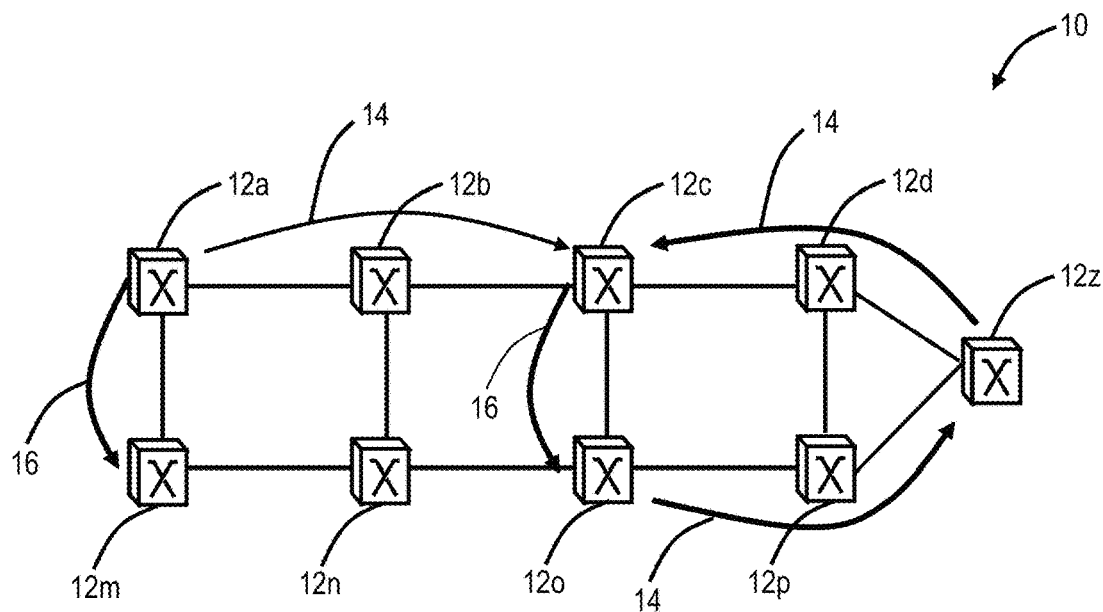

FIG. 4 illustrates the network 10 showing IS-IS flooding and installation of segments in Segment Routing. For example, FIG. 4 includes node segments 14 and adjacency segments 16 for the example in FIG. 3 that are flooded and automatically installed by ISIS. Of note, Segment Routing has excellent scale with each of the nodes 12 installing N+A Forwarding Information Base (FIB) entries where N is the number of nodes in the domain, and A is a number of adjacency segments attached to each node. Each node 12 in the network 10 scales efficiently, e.g. much more than RSVP-TE. The state is located in each packet, not in the router. Scaling is on the order of N+A labels per node versus MPLS running RSVP-TE, which requires a total of N^2 paths to be signaled for a full mesh of point-to-point connections, of which a significant fraction will require state on each core router.

Multicast in Segment Routing—Principles of Operation

As described herein, an IGP-Source-Node Segment, also referred to as a "Source Node Segment" or "Source-Node-SID," (Segment ID) is the identifier of a specific router/switch for an IGP-Source-Node Segment, global within an SR/IGP domain. The IGP-Source-Node identifies multicast packets originated from that router/node. For a Multicast Forwarding Plane, each Broadcast Tree rooted at a node is confined to a single forwarding plane. Multiple planes may be used to allow source-rooted trees with different active topologies to be defined for each node, for load-spreading or other reasons. A Multicast Flow Identifier (MFID) is a global identifier specifying the nodal endpoints of an individual multicast tree. It is advertised by each node hosting an instance of a multicast flow using the IGP, to allow all nodes to compute their role, if any, in supporting each flow. In the forwarding path, it is carried as a label to control the pruning of a broadcast tree primitive to deliver a flow-specific multicast tree.

The Source Node Segments in an SR domain are assigned within a Segment Routing Global Block [ref: draft-filsfils-rtgwg-segment-routing, versions 00-08, available at tools.ietf.org/html/draft-filsfils-spring-segment-routing-08, the contents of which are incorporated by reference]. The Source Node Segments are advertised by the IGP throughout the SR domain exactly as described in [draft-filsfils-rtgwg-segment-routing] for other segment types.

For multicast, the Source Node Segments are used to construct source routed trees rather than destination-based paths. The source routed trees are used to define broadcast paths, versus the destination-based paths which are used conventionally in Segment Routing to define a node segment. The procedures for processing Source Node Segments are different from other segments, as follows:

The route computation is no longer a single Shortest Path First (SPF) for each node; it is an "all-pairs SPF" calculation in which each node computes the SPF calculation for every node in the network. As a result, every node can locally compute not only its "own" broadcast tree but also its position on the broadcast tree rooted on every other node, with no need for further information from any other node.

In the case of equal cost paths, a consistent view for all nodes is ensured by a position-independent tie-breaking procedure, to guarantee that all nodes compute exactly the same set of broadcast trees. In this, an individual path is characterized by a lexicographically ordered list of Node Identifiers (which is invariant under a node's position in the network), and the selected path is determined by choosing either the low-order path or the high-order path at the first point at which the ordered path descriptors differ. To exploit more extensive path diversity, multiple ordered lists can be created by linear modification of the Source Node Identifiers prior to their ordering.

In a preferred embodiment of the invention, application of the lexicographic tie-breaking procedure to equal cost paths is preceded by an initial assessment of path preference based on the number of leaves which can be served by each candidate path. The path serving the highest number of leaves is selected. Only if this comparison does not unambiguously select a preferred path is the lexicographic tie-breaking procedure invoked.

The Source Node Segments enables the extension of Operations, Administration, and Maintenance (OAM) functions for monitoring and measurement of the intrinsic multicast topology created. This is best understood with reference to commonly-assigned U.S. Pat. No. 9,094,337, with the same inventors, issued Jul. 28, 2015, and entitled "SOURCE IDENTIFICATION PRESERVATION IN MULTIPROTOCOL LABEL SWITCHING NETWORKS," the contents of which are incorporated by reference. In addition, with algorithmic and message processing extensions to base OAM and the IGP protocol (e.g., IS-IS) the set of combined paths constructed of Source Node Segments are also available to enable domain network fault detection and expedient propagation of the resulting detected faults to improve scale and speed of network level re-convergence.

It is the case that the approach advocated in the multicast systems and methods incurs a×N route computation load per node compared with a conventional single node SPF calculation; however, this has now become an "affordable" computation cost. Since the Dijkstra SPF computation was deployed for distributed route computation there has been a two to three times order of magnitude increase in raw processor performance; "all pairs SPF" computation has been demonstrated with adequate real-time performance at scale with current processor and memory systems. Signaling, which runs over a converged unicast topology, is the alternative—so incurs delay; and has not, in terms of raw performance, tracked computation. That is, the multicast systems and methods propose increasing per node computation to reduce signaling. This trade-off in the aggregate improves performance.

Multiple Multicast Planes

The description above introduced a position-independent tie-breaking procedure. Following the procedures proposed in [draft-bowers-spring-adv-per-algorithm-label-blocks, available at tools.ietf.org/html/draft-bowers-spring-adv-per-algorithm-label-blocks-02, the contents of which are incorporated by reference], multiple tie-breaking procedures can be defined. Multiple multicast planes can be specified, each distinguished by different non-overlapping ranges within a Segment Routing Global Block (SRGB) space. In the context of multicast, the semantics of each range is that each points to a different routing algorithm.

All routing algorithms must implement a deterministic tie-breaking procedure so that all nodes are able to compute locally an identical set of trees, and hence have a consistent view of network routing. The procedure defined here characterizes individual point-to-point paths by a lexicographically ordered list of the nodal indices into the SRGB (which is invariant under a node's position in the network). When there is more than one equal cost path between two nodes, the selected path is determined by choosing either the low-order path or the high order path at the first point at which the ordered path descriptors differ. "High path" and "Low Path" are two of the tie-breaking algorithms which can be used; other orderings can also be employed. For example, application of the lexicographic tie-breaking procedure to equal cost paths may be preceded by an initial assessment of path preference based on the number of leaves which can be served by each candidate path. The path serving the highest number of leaves is selected. Only if this comparison does not unambiguously select a preferred path is the lexicographic tie-breaking procedure invoked.

If different multicast flows are assigned to different forwarding planes (i.e. algorithms), this ensures that alternative routes for multicast trees are likely to be selected if they are available. It is a feature of this construction method that any path which is a subset of a longer shortest path is also itself a shortest path. Consequently, the full set of trees constructed in this way follows self-consistent paths. In another embodiment, a mask can be used with the mask identified with an algorithm. The algorithm can specify that, prior to lexicographic ordering, this transformation is applied to the Node IDs: Source Node Segment=Source Node Segment XOR mask MOD block length—This ensures that alternative routes for multicast trees are selected if they are available. Those skilled in the art will readily understand that a number of methods may be applied in order to alter the results of lexicographic ordering and thus select alternative routes. The same methods must be used by all routers within an SR domain.

Pruned Trees

The previous discussion has centered on the generic case of the source-rooted broadcast tree. More refined multicast trees may be defined; these may be composite (aggregate) trees, supporting multiple flows on a single tree, or they may be per-flow trees. Broadly, per-flow trees offer the most efficient use of network resources but require the installation of per-tree state in the core network. Aggregate trees can reduce the overall core network state required, but they incur inefficiencies as a result of being a superset of any per-flow tree, and can also present maintenance challenges as tree membership evolves over time.

Pruning of Broadcast trees (composite or per-flow) is carried out as follows. For each pruned multicast tree, a (globally unique) Multicast Flow Identifier (MFID) is provisioned on each edge node terminating that tree. The MFID is advertised via the IGP (as is done for Source-Node-SIDs), thereby allowing all nodes in the domain to compute the SPF multicast trees required to join the endpoints specified by the MFID, and their positions on those trees. The MFID is loaded as the label immediately below the Source-Node-Segment-ID on the label stack. Following the "all-pairs SPF" calculation described herein, every node can determine whether it lies on the SPF route for this specifically pruned tree, and hence whether forwarding state needs be installed.

On the forwarding path, a node receiving a Source-Node-SID which has previously computed that it lies at a branch point on the specified broadcast tree must "POP" this label, as it is also a potential branch point on the multicast flow carried. Expressed another way, the Source Node Segment is interrupted at branch nodes because flow-specific processing must be applied. This allows the MFID carried in the label below to be inspected to identify the (subset) of active egress ports on the broadcast tree which lie on the multicast tree. The original Source-Node-SID is then "PUSHed" back onto the packet prior to replicating and forwarding. A node receiving a Source-Node-SID which has previously computed that it provides only point-to-point transit for the specified broadcast tree MAY execute the Segment Routing CONTINUE function. To emphasize, no multicast state needs be installed in the core network to configure these pruned trees, only the Source-Node-SID defining the template broadcast tree. In core nodes, local computation is used to determine the bit mask (or other forwarding structure) used to prune each broadcast tree on the basis of the core node's position on each participating edge node's tree.

Figure 8:
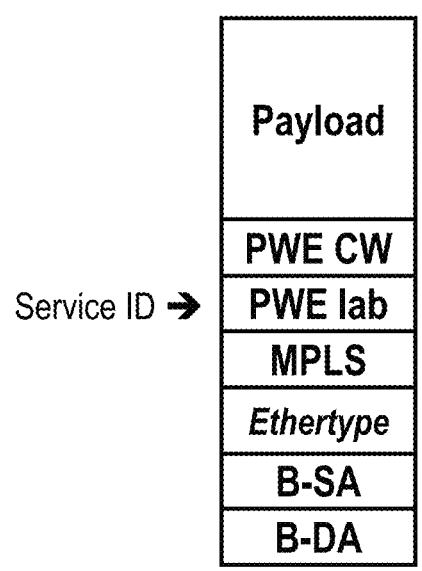
FIG. 8 is a diagram of a packet with associated labels.

This capability requires the "POP" of the Source-Node-Segment-ID, parsing of the multicast identifier in the field above to identify the (subset) of active egress ports, and "PUSHing" of the Source-Node-Segment-ID prior to forwarding. In FIG. 8, the multicast identifier is called "PWE lab." It could indeed be a PWE label, but if the payload is not a pseudowire, or if it is desired to maintain unaltered the present PWE label semantics, then an explicit SR multicast identifier will be inserted as a label below the Source-Node-Segment-ID and above any PWE label.

Looping and Restoration

Packet looping is always a hazard in multicast networks. The multicast systems and methods use standard SPF restoration techniques on topology change; when a topology change is advertised by the IGP, all nodes recalculate all paths, and so the end result will ultimately converge on a common view of the topology by all nodes, but during the re-convergence period loops may occur because of transient differences in perceived topology between nodes.

To mitigate the adverse effects of packet looping, all participants in the scheme proposed herein must apply a Time-to-Live (TTL) value on all ingress packets equal to the maximum network diameter of the trees which they source. The nodes may also apply a loop avoidance procedure as follows: when alerted to a topology change (by the IGP), a node may continue to forward on a multicast tree if its computed path to the root of the tree is unchanged under the new topology; if its path to the root of a tree is altered as a result of the topology change, the node must disable forwarding on that tree until it has an agreed view of topology with its adjacencies; and an "agreed view of topology" is determined by the exchange of a digest of the local view of the complete network topology, which is exchanged in IGP HELLO messages.

Traffic Engineering with Multicast Segment Routing

Limited but useful support for Traffic Engineered trees can be supported by the Segment Routed multicast model. In its simplest form, a proxy-root is configured by management, and that node roots an (S, G) tree constructed as described previously, with G=MFID. S is the IGP-Source-Node label of the proxy-root. Traffic from the ingress is unicast to the proxy-root using normal Segment Routing techniques: Top of Stack can be an IGP-Node Segment to define a loose route, or a deeper stack can be used to define a more specific route.

In either case, the label on the stack below the IGP-Node Segment label specifying the unicast destination as the proxy-root is the IGP-Source-Node label, which specifies that the shortest path broadcast tree rooted at that point is to be followed downstream. The entire label stack, including the multicast labels, is imposed by the ingress node as part of mapping the ingress flow to the SR domain. This approach may be extended to define two or more proxy-roots. Each proxy-node roots a separate sub-tree defined by the IGP-Source-Node. The MFID for each sub-tree must also be different, in order not to corrupt the flow identifier binding procedures based on global advertisement of MFIDs. The two or more proxy-roots are fed by edge replication and unicast from the ingress. Following standard edge replication practice, the ingress node builds a customized header for unicast to each proxy-root. The ingress node is the only point which is aware of the binding of the multiple sub-trees into the aggregate flow.

Other Tree Types

So far, the construction of optimized shortest path multicast trees has been described. The penalty paid for the optimization is the need to construct an (S, G) tree for each node sourcing traffic into the multicast flow, which can become a substantial state burden if many multicast flows are to be supported. The same infrastructure which supports (S, G) trees can be reapplied to support (*, G) trees when required, with substantial state savings.

To achieve this, Spanning Tree is specified as the Algorithm applying to a designated range in the SRGB, with IGP-Source-Node labels assigned in that range. Then, the proxy-node described previously under "Traffic Engineering with multicast Segment Routing" is inherited as the basis of (*, G) tree construction.

A proxy-node is assigned the role of a spanning tree root, and flows (MFIDs) are associated with that tree. A bidirectional spanning tree is constructed, using the consistent tie-break procedures described previously, with each node in the domain computing its role and installing appropriate forwarding behavior. The actual nodal forwarding behavior is "flood with poisoned reverse" between the ports supporting a specific flow.

The role of ingress node in (S, G) trees does not exist for spanning tree operation; all participants in the multicast flow are equivalent. The tree root may be an active participant, but need not be. The root node advertises the MFID irrespective of whether or not it terminates the traffic.

Sub Type-Length-Value (TLV)

The multicast systems and methods require new IS-IS sub-TLVs for multicast Segment Routing. All multicast SR nodal information extensions except the multicast SR Digest travel within a Multi-Topology Capability TLV. An IGP-Source-Node label sub-TLV enables a node to advertise the SR global label it will use in the data path to identify a broadcast tree rooted on it. A Multicast Flow identifier (MFID) sub-TLV enables an SR edge node to advertise that it forms an end-point of the specific multicast tree identified by that MFID. These advertisements allow all nodes in the SR domain to compute the topology of that multicast tree, and to install forwarding state when appropriate. Multicast Segment Routing Capability identifies the advertising node as capable of performing multicast segment routing as described herein. A Multicast SR Digest sub-TLV is optionally added to an Intermediate System HELLO (IIH) Protocol Data Unit (PDU) to indicate the current SR topology digest value as computed by the advertising node. The computation procedure is described in Shortest Path Bridging (SPB). Digest exchange between adjacent nodes supports the optional loop avoidance procedures of multicast SR.

Simplified MPLS (S-MPLS)/Multicast for SR

Current Ethernet Local Area Network (E-LAN) service deployments are typically metro-scale. Some service providers have deployed VPLS; others have deployed native Ethernet Solutions PB (Q-in-Q) and early PBB (MAC-in-MAC). All of these have scaling challenges, such as the use of full-mesh point-to-point (p2p) transport and per service pseudowire mesh for VPLS, the need for Customer MAC (C-MAC) learning in the core for H-VPLS and PB, and the reliance on native Ethernet Spanning Tree Protocol (STP) and "flood and learn" for PB and PBB. A Simplified MPLS technique provides improved scaling for E-LANs, amongst other services for which resilient, scalable multicast and broadcast are required. Note, this S-MPLS technique shares similar techniques as the multicast systems and methods for Segment Routing.

S-MPLS or Multicast for SR includes p2p trunks with Traffic Engineering (TE) for the destination-based unicast connectivity type; the other is a LAN segment for any-to-any (a2a) connectivity. To build LAN segment, a big virtual Ethernet switch is built with "ports" addressed by a global label assigned to the Edge Node hosting the port: broadcast/multicast/unknown flooding at client layer maps to S-MPLS source-based multicast; known C-MAC to 5-MPLS label bindings use unicast connectivity; and resilient any-to-any connectivity is most simply achieved by using a distributed control plane.

S-MPLS needs no change to the MPLS data plane; in the Control Plane, guaranteed loop-free operation of optimized multicast trees requires an Agreement protocol, but loop mitigation requires only the MPLS label TTL field.

The widely known implementation of SR (/S-MPLS) is implemented using the MPLS forwarding path. SR is also defined for IPv6 implementation. Multicast for SR (and S-MPLS) can also be implemented with IPv6. In this embodiment, all the principles of multicast for SR are inherited unaltered, and a single IPv6 address in the header can describe a multicast instance of a source-routed broadcast tree. The Source Node Segment Identifier, and the algorithm definition if multiple planes are implemented are carried in the routable component of the IPv6 address, and the multicast Service Identifier is encoded in the remaining 64 bits.

For each S-MPLS label used for this mode of operation, the Control Plane configures shortest path unicast and multicast connectivity between nodes, and Loop suppression is applied to S-MPLS packets. This is a better infrastructure layer for client services. Pseudowire (PWE) over S-MPLS already isolates clients from the infrastructure in the core and keeps client state at the edge. Client multicast and broadcast, particularly C-MAC flooding for Ethernet services, maps to scoped S-MPLS multicast. Client to Virtual Port (=Edge Node label) bindings is learned at the edge as in conventional bridged operation. Virtual broadcast domains are constructed via IS-IS driving optimized mesh forwarding.

Figure 5:
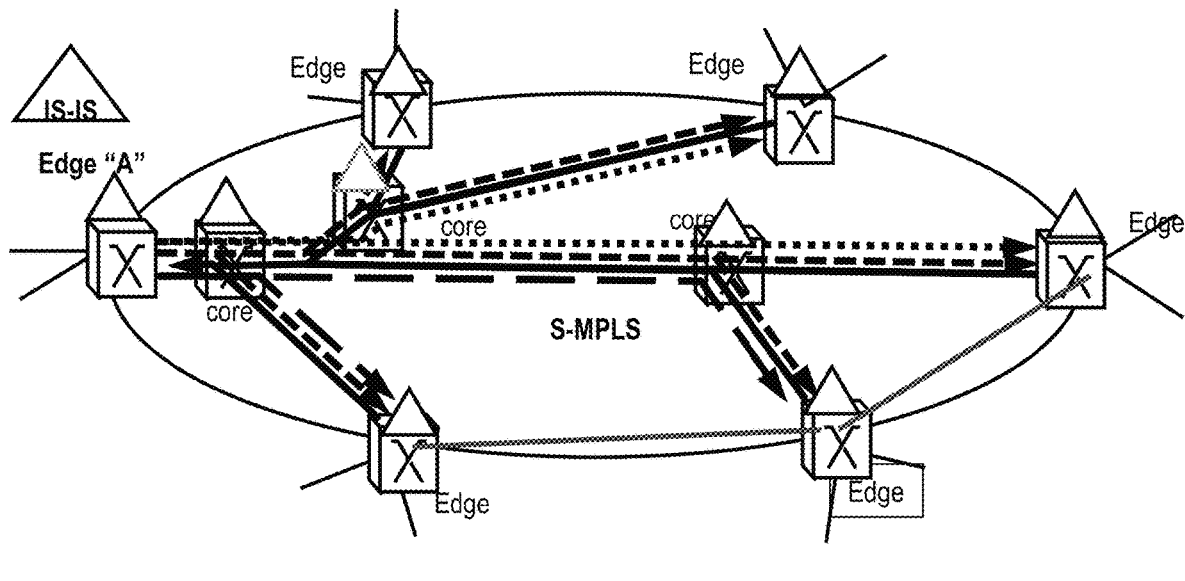
FIG. 5 is a network diagram of a network using Simplified MPLS-based on Segment Routing with extensions.

Referring to FIG. 5, in an embodiment, a network diagram illustrates a network using S-MPLS or Multicast for SR. The S-MPLS or Multicast for SR network illustrates a point-to-multipoint (P2MP) tree for a multicast label, a multipoint-to-point (MP2P) tree for a unicast label, and optimal trees for different SIDs (Service Instance Virtual Local Area Network ID). The "all pairs" SPF calculation is used by every node to determine the forwarding state to be installed for every service. The rule is, "If I am on the shortest path between any two nodes, and if they have services in common, install the required labels to hook them up." In this example of FIG. 5, an MP2P tree is configured to edge node "A" and a P2MP tree is configured from the edge node "A."

Unicast/multicast congruency and symmetrical metrics are valued, avoiding loops and black-holing as both multicast and unicast forwarding path fate share, this is especially valuable when carrying customer Ethernet Bridge Protocol Data Units (BPDUs). This avoids out-of-order delivery as both unknown and known packets to a destination share the common path and queuing discipline. For OAM procedures, proper fate sharing of multicast OAM at the client layer and S-MPLS layer between unicast and multicast forwarding paths minimizes the chance of undetected faults, Furthermore, for Ethernet clients, there is a benefit in being consistent with IEEE fate sharing in both directions to minimize the probability of uni-directional failures.

Multicast for SR inherits all of the desirable OAM properties of S-MPLS. Because the Source Node Segment Identifier is carried as the tree identifier from end to end across the SR network, at any point the source of a packet is can be identified. Also, OAM packets may be transmitted onto a tree with the knowledge that they will be subject to exactly the same forwarding path treatment as user data packets.

The Control Plane uses a Link State routing system—IS-IS. IS-IS floods topology, 5-MPLS (transport) labels, and per-service (PWE label) information. There are global values, no local link state required, that collapse all required functionality into one protocol. Nodes use routing information to construct unicast and per service multicast connectivity. When the routing system has converged in a network: each node roots per-service p2mp multicast trees and each node sinks at least one mp2p unicast tree.

To mimic this, S-MPLS must address various issues: Ethernet has MACs (endpoints), and VLANs (routes); MPLS has just labels; Each destination-based (unicast) tree may use a different label; the PWE label should be a global service ID (allow flooding, & all-pairs SPF); Source-based multicast trees have to be global and service-specific: This allows 1M services, c.f. 16M for Shortest Path Bridging-MAC (SPBM).

S-MPLS/or Multicast for SR Multipath

Multiple topologies require multiple destination-based trees rooted on each node—with one nodal label per tree. It is possible to assign services algorithmically to trees, e.g., even numbered service identifier to one tree, odd to the other (or something else simple). When equal cost paths are detected tie-breaking ranks them so as to maximize diversity; assign services accordingly: multiple distributed algorithms can be used which ensures that every node makes the same "go left" or "go right" decision. Although a destination label for each node will appear in each tree, the multicast state does not multiply up as a given source-based service label only appears in a single tree.

Figure 6:
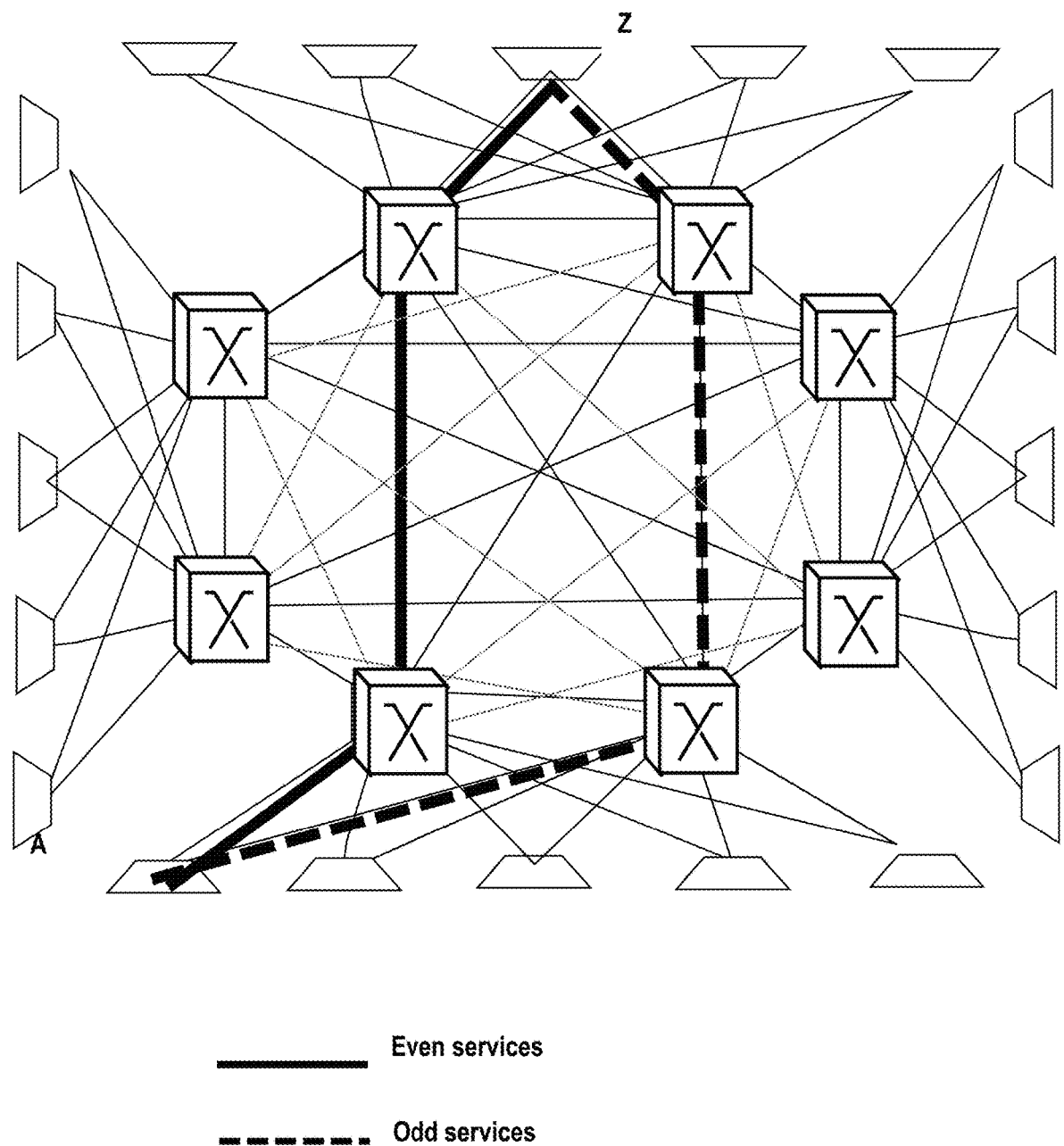
FIG. 6 is a network diagram of "even-labelled" and "odd-labelled" services in a network. "Even" and "odd" represent services classified by some attribute of their service Id.

Referring to FIG. 6, in an embodiment, a network diagram illustrates "even" and "odd" service assignments in a network. "Even" and "odd" in this context represent services allocated to forwarding planes on the basis of their multicast service Id number, but if will be obvious that other allocation methods can be used. Specifically, FIG. 6 illustrates a dual homed path onto a symmetric mesh that naturally produces diverse paths e2e by the use of different tie-breaking algorithms. Service-based spreading means a given customer gets consistent and measurable treatment by the network; a service=flow in true randomization schemes.

This approach to multicast for SR has "best in class" properties, namely Shortest path trees with link state & OAM in the data plane; Arbitrary optimal trees for multicast; Fast convergence, no disruption to traffic unaffected by a fault (due to each device having a link state database); Loop mitigation (due to inheritance of TTL mechanisms); and Massive scalability. This complements unicast SR to provide a comprehensive solution to the MEF service set for Ethernet clients: ELINE using SR, ELAN and ETREE with this compatible multicast model.

Figure 7:
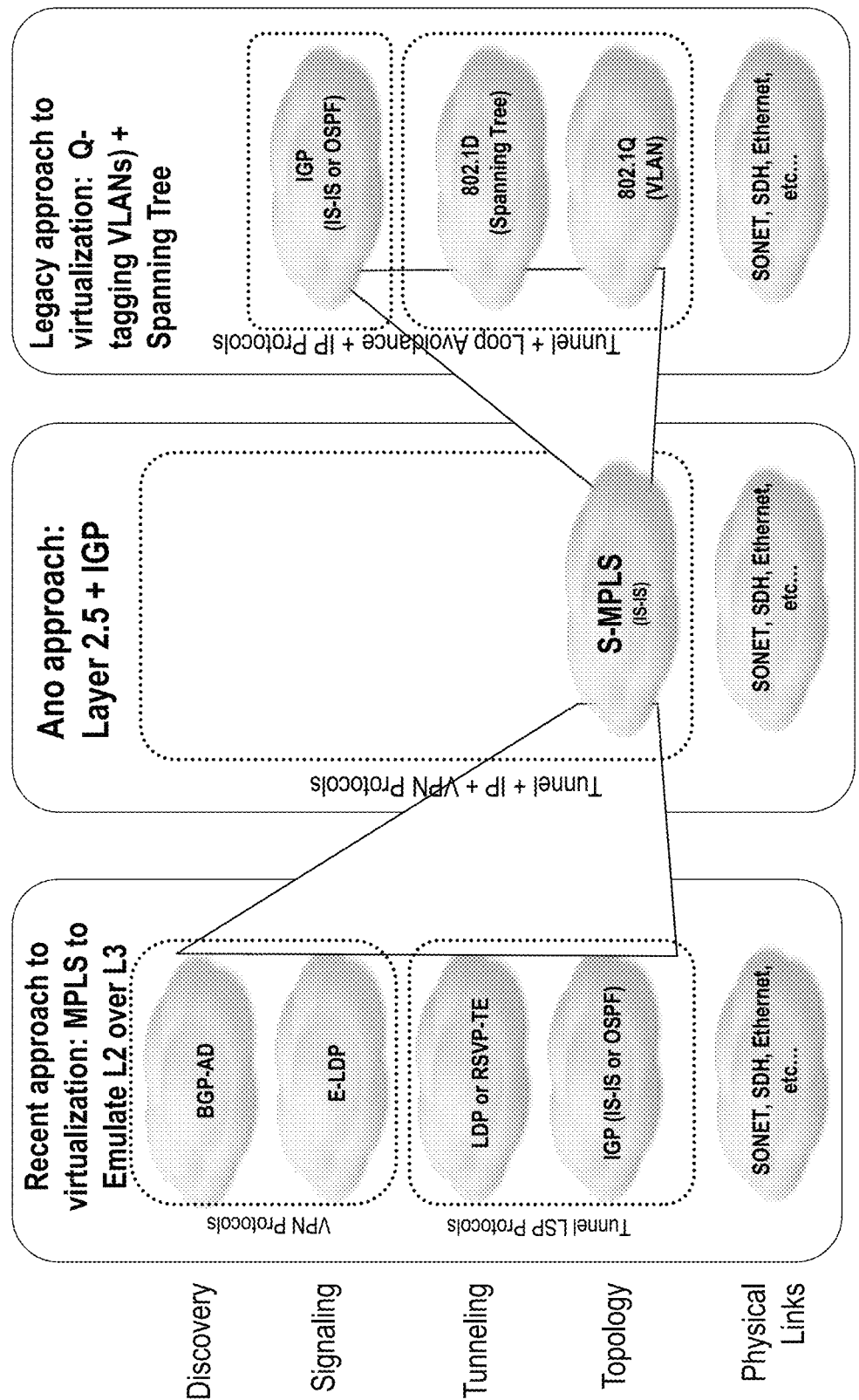
FIG. 7 is a protocol diagram of the massive simplification using the systems and methods described herein.

Referring to FIG. 7, in an embodiment, a protocol diagram illustrates the massive simplification using the systems and methods described herein.

Referring to FIG. 8, in an embodiment, a diagram illustrates a packet with associated labels. This indicates using the MPLS label as the Source-Node-Segment-ID, with multiple Source-Node-Segment-IDs per node being used to distinguish between different algorithms used to compute different trees.

The PWE label has the right semantics to carry a Service Identifier: for use in this context it should be Global, and provisioned at each Edge Box with an instance of the specific service. An alternative realization would use a distinct MPLS label for this purpose, carried immediately below the Source-Node-Segment-ID, and carrying a global Service Identifier. In this way, the current semantics of the PWE Label would be preserved.

The explicit multicast service identifier label, or the PWE label, is a domain-wide identifier uniquely identifying a service. It is used to prune the broadcast tree defined by the MPLS label to generate a set of optimized service-specific shortest-path multicast trees. It is provisioned on every NE hosting a service instance, this is flooded by IS-IS-SPBM, whereupon every node can use all-pairs Dijkstra to determine what forwarding state (if any) it needs to install to support that tree.

Example Node

Figure 9:
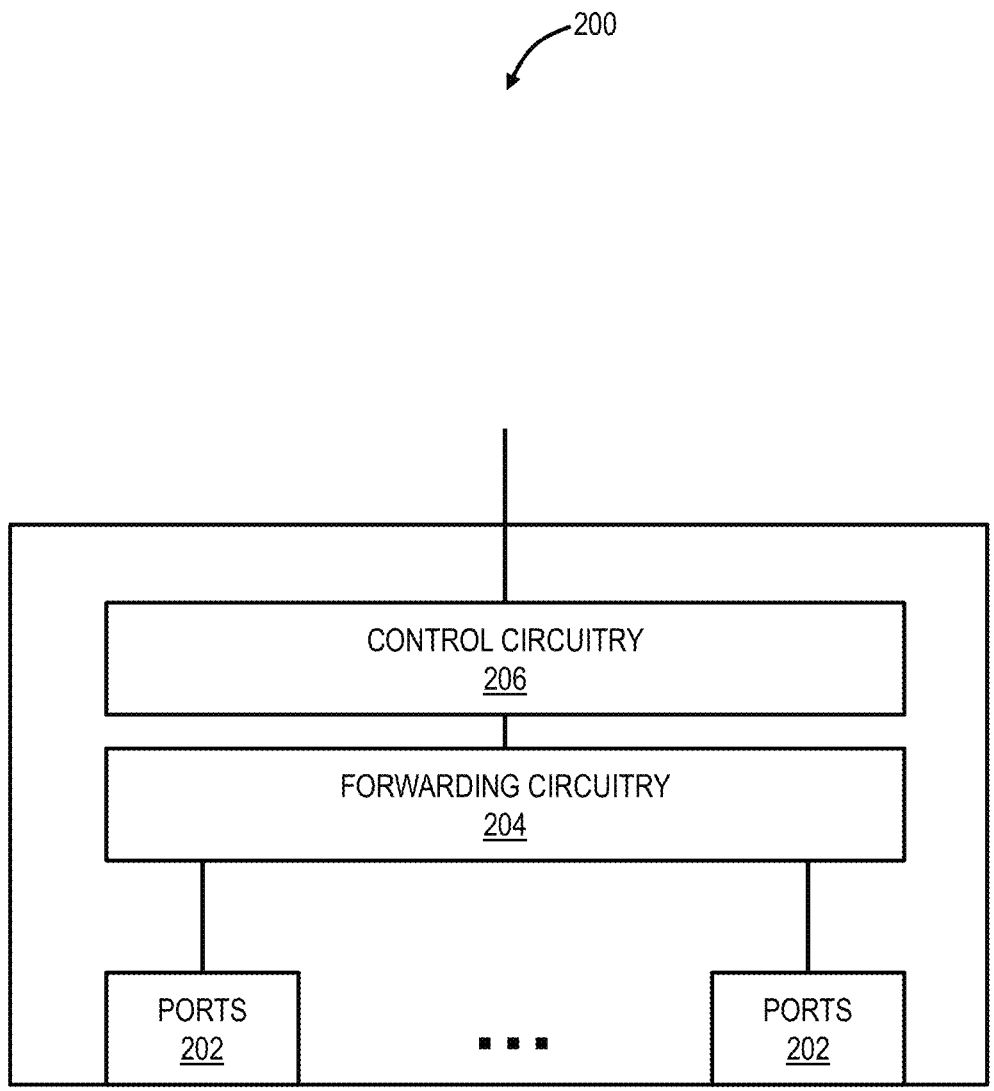
FIG. 9 is a block diagram of an implementation of a node which may be used with the systems and methods.

Referring to FIG. 9, in an embodiment, a block diagram illustrates an example implementation of a node 200 which may be used with the systems and methods. In this embodiment, the node 200 is a switch for illustration purposes, but those of ordinary skill in the art will recognize the systems and methods described herein contemplate other types of network elements and other implementations. In this embodiment, the node 200 includes a plurality of ports 202, forwarding circuitry 204, and control circuitry 206. The node 200 can be an LER, LSR, P node, PE node, etc.

The ports 202 provide physical connectivity of the node 200 to other network elements, switches, routers, etc. The ports 202 are configured to provide ingress and egress of packets such as packets utilizing the systems and methods described herein. The forwarding circuitry 204 is configured to forward packets, such as with Segment Routing, S-MPLS, etc. The control circuitry 206 is configured to provide exchange and/or flooding of the block of labels associated with the node 200. For example, the control circuitry 206 can perform the basic IS-IS protocol, without requiring IS-IS traffic engineering extensions or RSVP-TE and/or LDP for packets.

Multicast Process for Segment Routing

Figure 10:
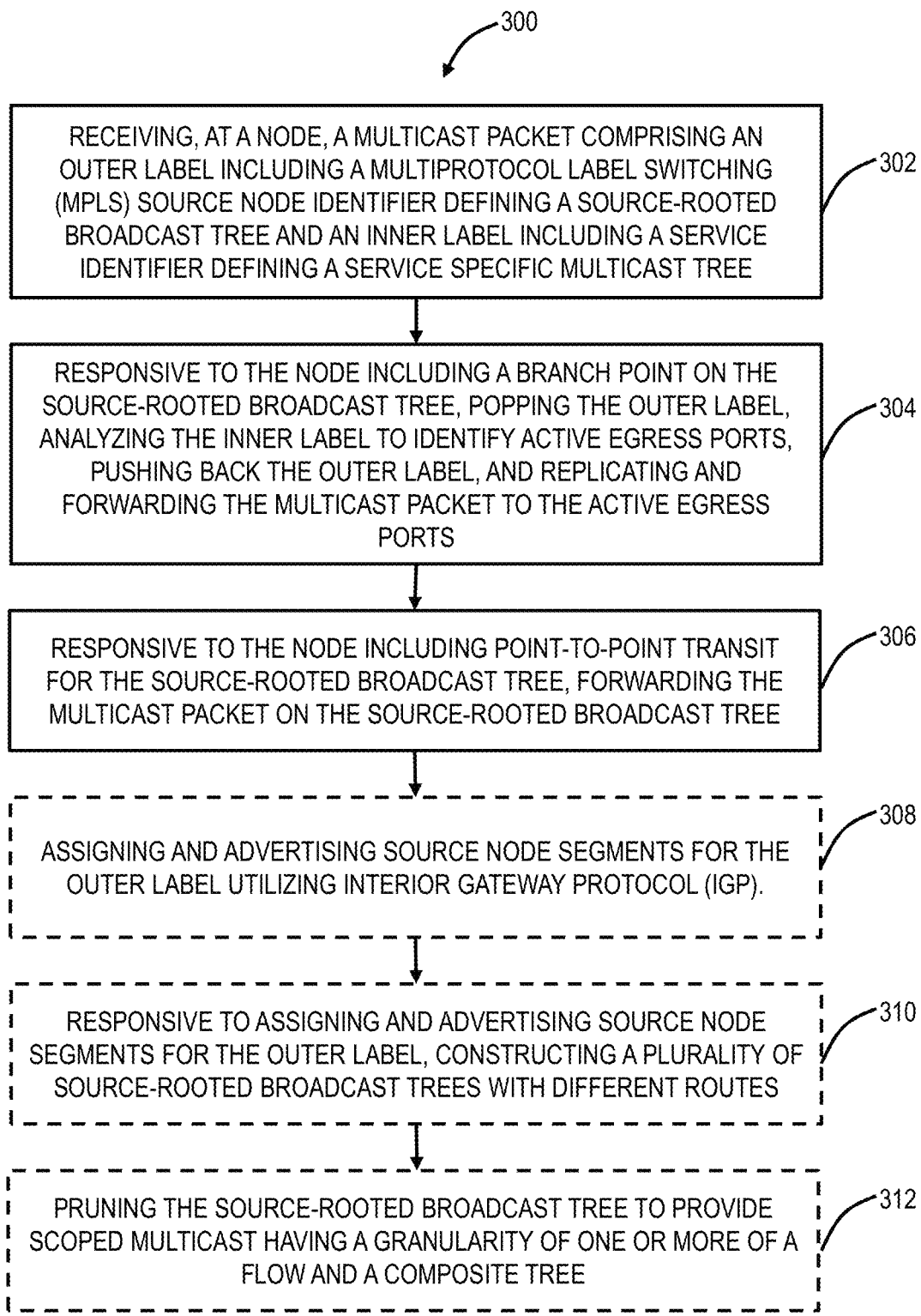
FIG. 10 is a flowchart of a multicast process for Segment Routing.

Referring to FIG. 10, in an embodiment, a flowchart illustrates a multicast process 300 for Segment Routing. The multicast process 300 includes receiving, at a node, a multicast packet including an outer label including a Multiprotocol Label Switching (MPLS) source node identifier defining a source-rooted broadcast tree and an inner label including a service identifier defining a service specific multicast tree (step 302); responsive to the node including a branch point on the source-rooted broadcast tree, popping the outer label, analyzing the inner label to identify active egress ports, pushing back the outer label, and replicating and forwarding the multicast packet to the active egress ports (step 304); and responsive to the node including point-to-point transit for the source-rooted broadcast tree, forwarding the multicast packet on the source-rooted broadcast tree (step 306). The outer label is a globally unique label within the Segment Routing and Interior Gateway Protocol (IGP) domain that identifies a specific router, and the inner label is a globally unique identifier specifying nodal endpoints of an individual multicast tree.

The multicast process 300 can also include assigning and advertising source node segments for the outer label utilizing Interior Gateway Protocol (IGP) (step 308). The multicast process 300 can also include, responsive to assigning and advertising source node segments for the outer label, constructing a plurality of source-rooted broadcast trees with different routes (step 310). Specifically, each of the plurality of source-rooted broadcast trees have different routing, such as achieved by the different tie breakers described herein, and any one may be used as the source-rooted broadcast tree as a template for a service-specific multicast tree. The plurality of source-rooted broadcast trees can be constructed based on an all-pairs Shortest Path First (SPF) computation where the node computes the SPF for every node in a network such that the node computes its own source-rooted broadcast tree as well as its position on a source-rooted broadcast tree for every other node in the network.

The all-pairs Shortest Path First (SPF) computation utilizes a same tie-breaking procedure for equal cost paths for every node in a network. The same tie-breaking procedure can include ranking equal cost paths based on a number of reachable service end-points on each path. The source-rooted broadcast tree can be divided into a plurality of mutually exclusive subset trees with each subset rooted on a different intermediate node, and the forwarding for each of the plurality of mutually exclusive subset trees can include: pushing, at a source node, an outer Segment Routing destination label corresponding to a different intermediate node on top of the source node segment label; forwarding the multicast packet to the different intermediate node based on the outer label; and popping, at the different intermediate node, the outer label and forwarding the multicast packet on a subset tree rooted on the different intermediate node according to the source node segment label.

The multicast process 300 can further include pruning the source-rooted broadcast tree to provide scoped multicast having a granularity of one or more of a flow and a composite tree (step 312). The source-rooted broadcast tree is an inverse of a shortest path routed destination tree.

In another embodiment, an apparatus for multicast in Segment Routing includes circuitry adapted to receive, at a node, a multicast packet including an outer label including a Multiprotocol Label Switching (MPLS) source node identifier defining a source-rooted broadcast tree and an inner label including a service identifier defining a service specific multicast tree; circuitry adapted to analyze the inner label to identify active egress ports, pushing back the outer label, and circuitry adapted to replicate and forward the multicast packet to the active egress ports, responsive to the node including a branch point on the source-rooted broadcast tree, circuitry adapted to pop the outer label; and circuitry adapted to forward the multicast packet on the source-rooted broadcast tree, responsive to the node including point-to-point transit for the source-rooted broadcast tree.

In a further embodiment, a Segment Routing network with multicast support therein includes a plurality of nodes interconnected to one another; wherein, for a multicast packet, each node is adapted to: receive, at a node, the multicast packet including an outer label including a Multiprotocol Label Switching (MPLS) source node identifier defining a source-rooted broadcast tree and an inner label including a service identifier defining a service specific multicast tree; responsive to the node including a branch point on the source-rooted broadcast tree, pop the outer label, analyze the inner label to identify active egress ports, push back the outer label, and replicate and forward the multicast packet to the active egress ports; and, responsive to the node including point-to-point transit for the source-rooted broadcast tree, forward the multicast packet on the source-rooted broadcast tree.

Example Source-Rooted Broadcast Tree

Figure 11:
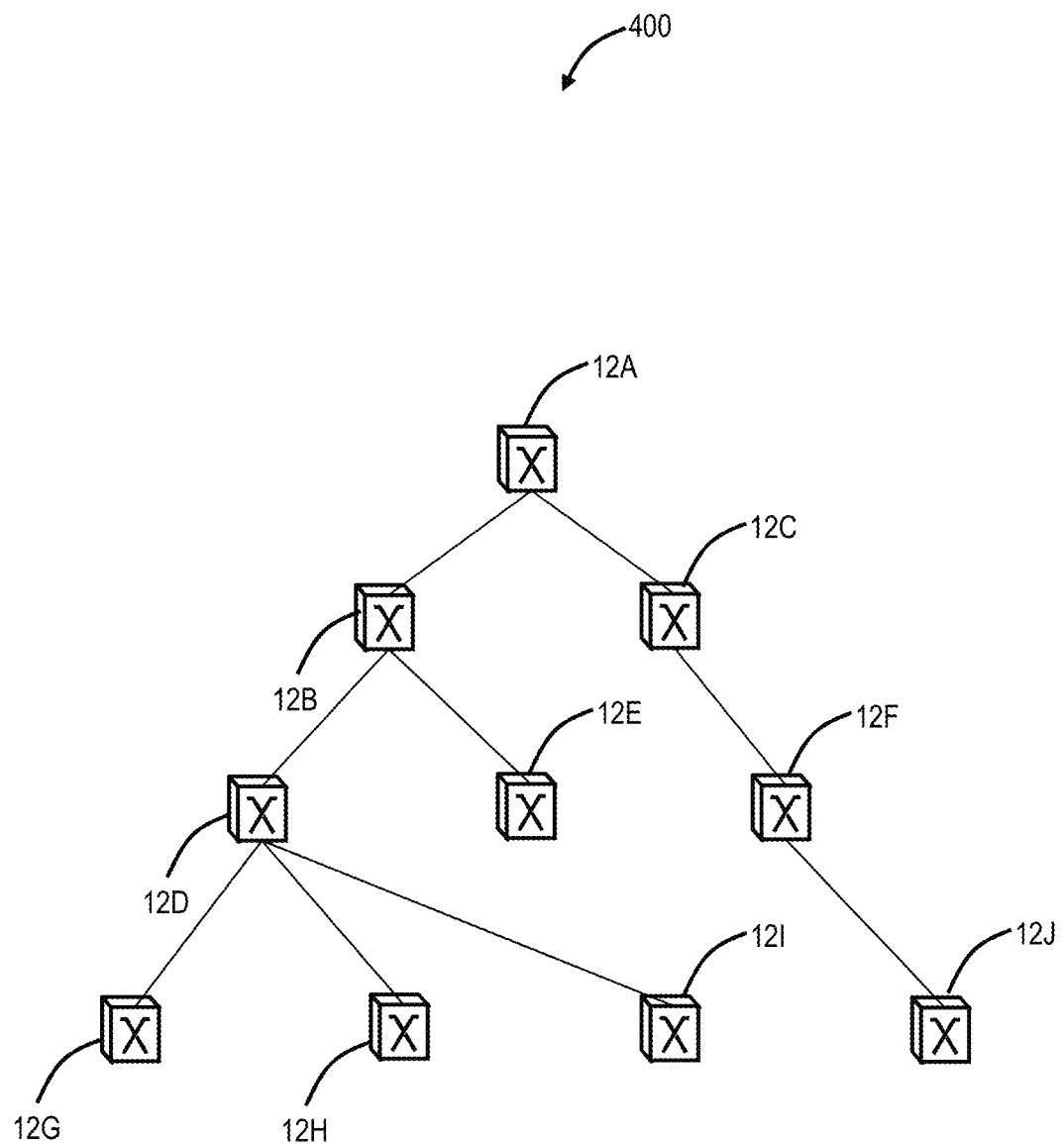
FIG. 11 is a diagram of a source-rooted broadcast tree which is a template for multiple multicast trees with a source node of a multicast packet and various other nodes.

Referring to FIG. 11, in an embodiment, a diagram illustrates an example source-rooted broadcast tree 400 with a source node 12A of a multicast packet and various other nodes 12B-12J. The source-rooted broadcast tree 400 is a template for multiple multicast trees each of which forwards multicast packets to a service-specific subset of nodes. A template tree is typically a broadcast tree connecting all network nodes, but it is understood that a multicast tree connected to a subset of nodes can also be used as a template. The source-rooted broadcast tree 400 is utilized in the multicast process 300 to provide a multicast packet from the node 12A to all of the other nodes 12B-12J using Segment Routing. Again, there can be a source-rooted broadcast tree 400 for each of the nodes 12A-12J and the source-rooted broadcast tree 400 is shown with the node 12A as the source node. Here, the node 12A transmits a multicast packet with the outer label identifying the source-rooted broadcast tree 400 and an inner label with the MFID identifying all of the individual multicast trees in the source-rooted broadcast tree 400. In this example, the node 12B is a branch point for the nodes 12D, 12E while the node 12C is point-to-point transit. At the node 12B, the node 12B is configured to pop the outer label, analyze the inner label to identify active egress ports to the nodes 12D, 12E, push back the outer label, and replicating and forwarding the multicast packet to the active egress ports. The node 12B is configured to forward the multicast packet on the source-rooted broadcast tree to the node 12F.

Unicast SPF

Figure 12:
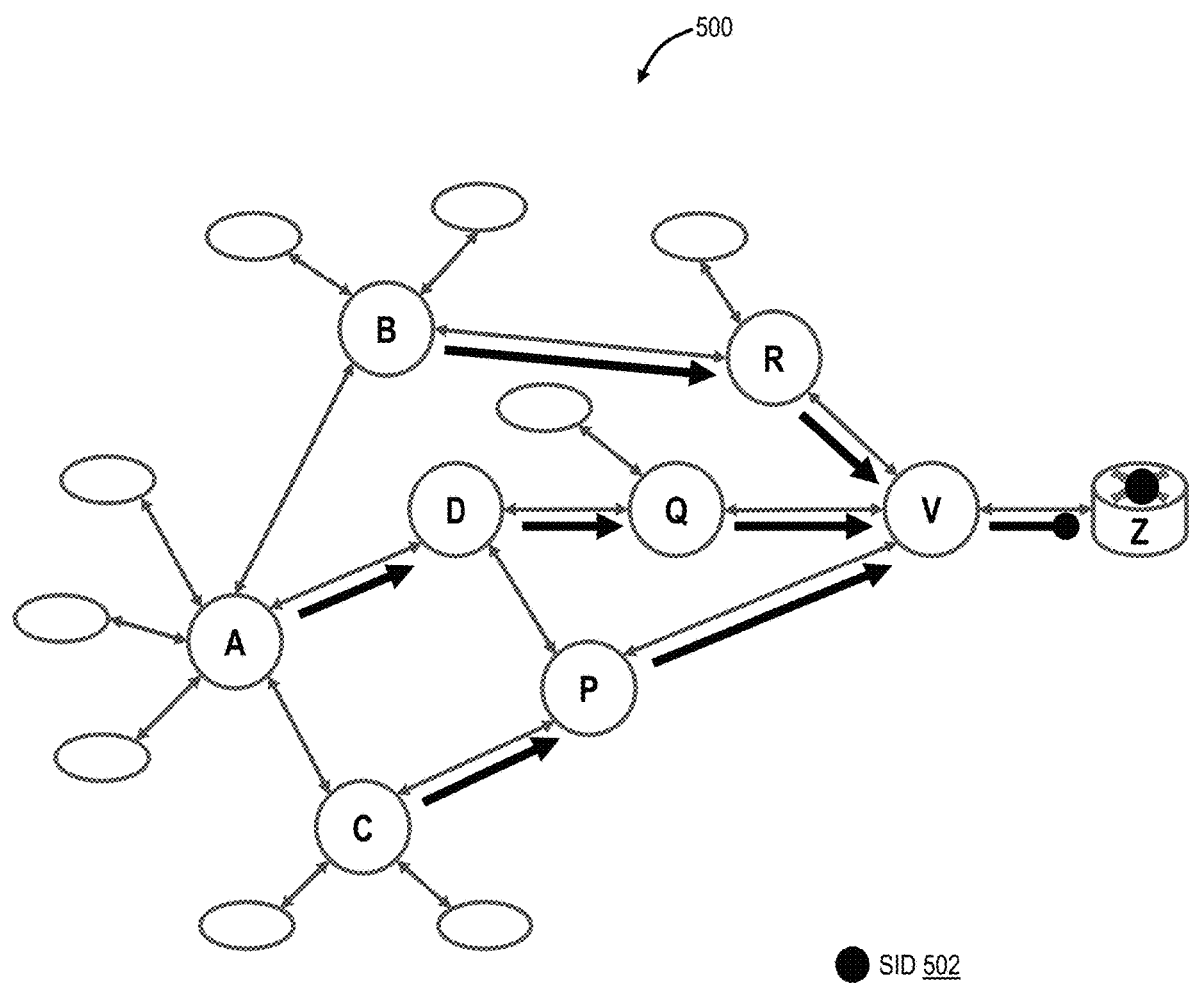
FIG. 12 is a network diagram of a network utilizing Segment Routing.

Referring to FIG. 12, in an embodiment, a network diagram illustrates a network 500 utilizing Segment Routing with nodes A, B, C, D, P, Q, R, V. Again, unicast Segment Routing-MPLS (SR-MPLS) relies on per-destination domain-wide SID 502, flooded via IGP. Each node (A-D, P-Q & V) locally installs a label in data plane based on conventional "shortest path" computation ("Dijkstra"). Traffic toward node Z follows Label Switched Paths (LSPs) (based on the SID 502 advertised by the node Z. The arrows in FIG. 12 represent a link "next hop" on each node. Note the merging at node V, this is inherent to sink-trees, an intrinsic property of SR-MPLS.

Broadcast Tree

Figure 13:
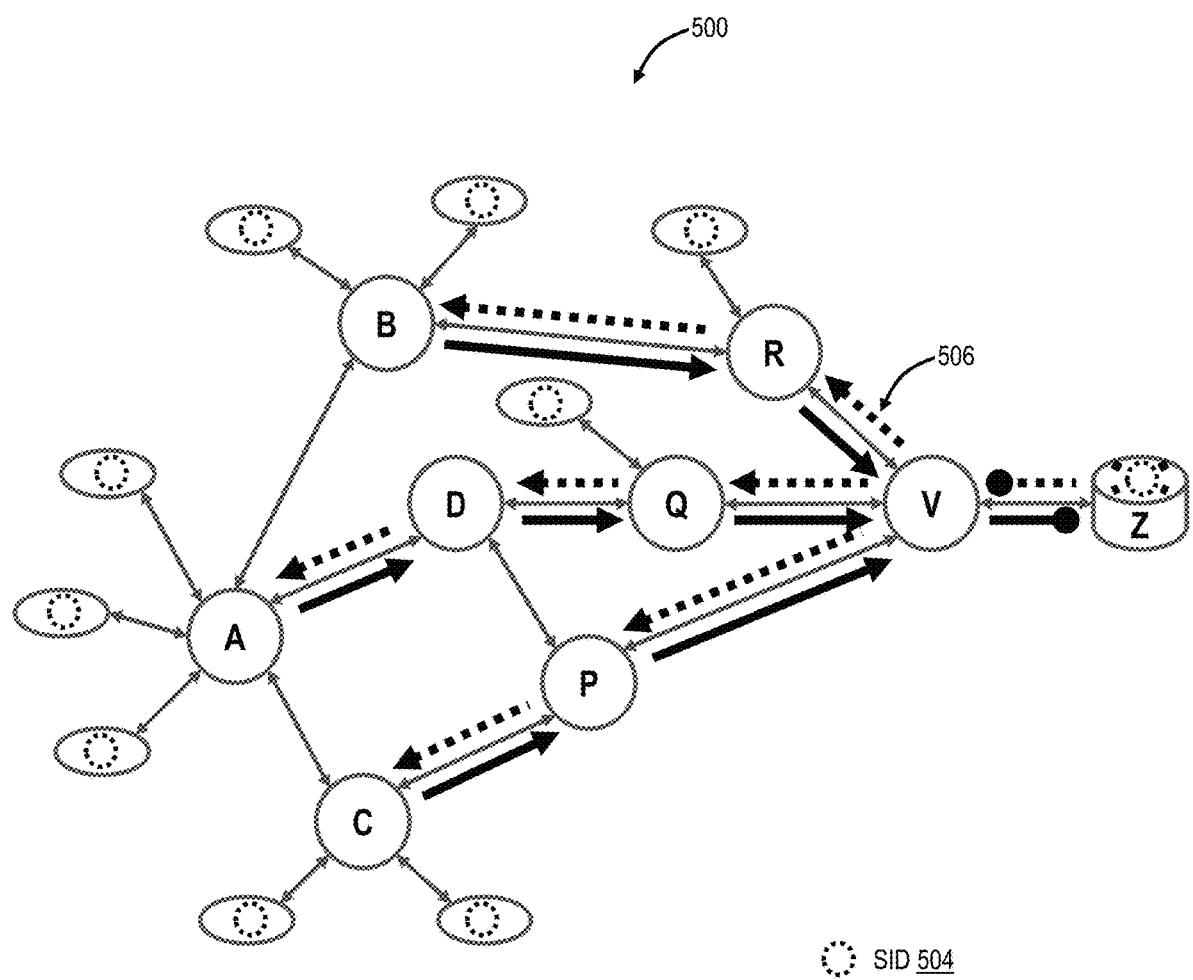
FIG. 13 is a network diagram of the network of FIG. 12 with a broadcast tree.

Referring to FIG. 13, in an embodiment, a network diagram illustrates the network 500 with a broadcast tree. Broadcast SR-MPLS tree is formed by using an Source Specific Multicast (SSM) per-(S,G) domain-wide SID 504, similarly flooded via IGP. Each node A-D, P-Q, V locally installs the label in data plane based on a "shortest path" computation, but in a reverse-forwarding direction with appropriate branch replication. The SID 504 (a "multicast-specific" from Segment Routing Global Block (SRGB)) is advertised by the node Z anchoring the source for a broadcast flooding tree. Dotted arrows 506 represent link "next hop" via each node. Note this graph is isomorphic to the unicast shortest-path but for the direction of arrows, with a branch replication at node V.

Multicast Model with Broadcast Tree

Figure 14:
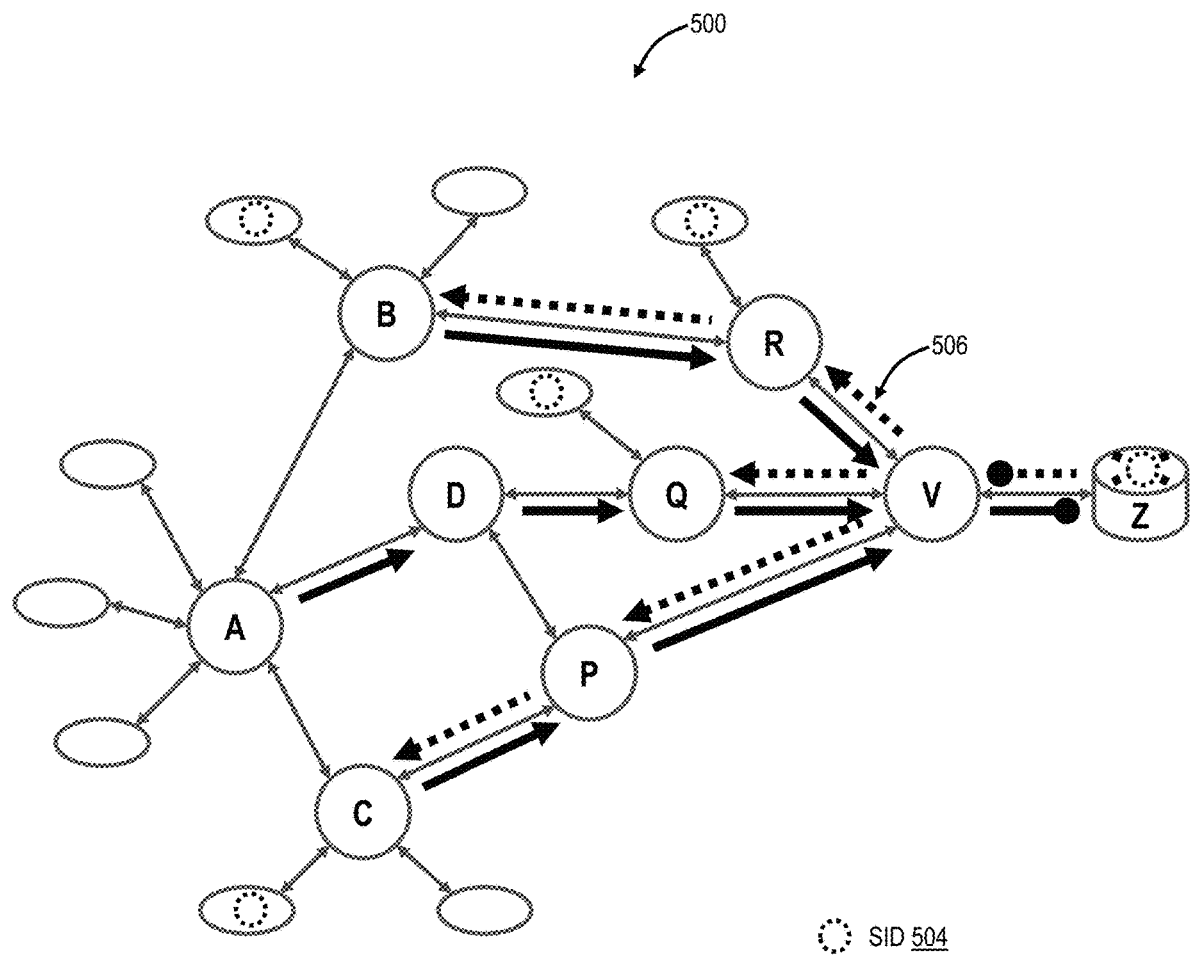
FIG. 14 is a network diagram of the network of FIG. 12 providing multicast via the broadcast tree of FIG. 13.

Referring to FIG. 14, in an embodiment, a network diagram illustrates the network 500 providing multicast via the broadcast tree of FIG. 13. The SID 504 (per-group multicast-specific from SRGB) is advertised by the node Z. Then nodes B, C, Q, R advertise group "listener." After computing, nodes B, C, P, Q, R, V generate an appropriate forwarding state based on pruning of the broadcast "template" tree, installing and maintaining the desired active sub-tree for the current listeners. The "listener" membership is indicated by reciprocal flooding of the group SID 504. An active SR-MPLS multicast group sub-graph tree is formed by algorithmic pruning of the template tree by each node in the domain, with label state installed only on active participating nodes.

Computation

As described herein, the necessary computation is distributed. Those of skill in the art will recognize this distributed computation can be replaced by a SSM source node or some computing entity on its behalf performing all the necessary computation. Here, only a single node (or its proxy) does the computational work of generating graphs of its rooted trees and sub-trees, and the node then, using a conforming representation of those graphs in a compact TLV representation of segment-routing instructions, use the IGP database flooding to inform the other nodes active in the network about the correct state of forwarding along the graph. The nodes that support the LSPs then install the correct state at their specific points along way. The benefits are two-fold: a reduction in overall computation and algorithmic certainty as only one node is doing the graph creation. A further benefit is the potential to use this also as foundation for applying traffic engineering methods on the graphs that are off shortest path, and doing so either locally at the root node or more likely in some compute entity with a more global view of overall network state.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A multicast method for Segment Routing comprising:
    in a Segment Routing network comprising a plurality of nodes, wherein Segment Routing utilizes globally significant labels as node identifiers such that path state installation is only required at an ingress node of a Segment Routing domain, advertising a multicast flow by a source node;
    determining roles in the multicast flow for the plurality of nodes locally at each node based on the advertisement;
    installing appropriate forwarding behavior for the multicast flow at the plurality of nodes based on a respective determined role;
    reciprocally flooding, by a listener node in the multicast flow advertised by the source node, a Segment Identifier (SID) to other nodes in the Segment Routing network.

2. The multicast method of claim 1, wherein the advertising utilizes Interior Gateway Protocol (IGP).

3. The multicast method of claim 1, wherein, for the multicast flow, source node segments are used to construct source routed trees, wherein the source routed trees define broadcast paths.

4. The multicast method of claim 1, wherein the multicast flow is assigned the Segment Identifier (SID).

5. The multicast method of claim 1, wherein the respective determined role is one of a branch point for replication, a root, and a leaf.

6. The multicast method of claim 1, wherein the multicast flow is a tree with a root at the source node, and further comprising:

pruning the tree to deliver a flow-specific multicast tree.

7. A Segment Routing network comprising:

a plurality of nodes interconnected to one another, wherein Segment Routing utilizes globally significant labels as node identifiers such that path state installation is only required at an ingress node of a Segment Routing domain;

wherein a multicast flow is advertised by a source node, wherein each of the plurality of nodes is configured to determine its role in the multicast locally based on the advertisement and to install appropriate forwarding behavior for the multicast flow based on a determined role, and wherein a listener node in the multicast flow advertised by the source node is configured to reciprocally flood a Segment Identifier (SID) to other nodes in the Segment Routing network.

8. The Segment Routing network of claim 7, wherein the advertisement utilizes Interior Gateway Protocol (IGP).

9. The Segment Routing network of claim 7, wherein, for the multicast flow, source node segments are used to construct source routed trees, wherein the source routed trees define broadcast paths.

10. The Segment Routing network of claim 7, wherein the multicast flow is assigned the Segment Identifier (SID).

11. The Segment Routing network of claim 7, wherein the determined role is one of a branch point for replication, a root, and a leaf.

12. The Segment Routing network of claim 11, wherein, at the branch point, the appropriate forwarding behavior comprises installation of labels for multiple egress ports associated with the multicast flow.

13. The Segment Routing network of claim 7, wherein the multicast flow is a tree with a root at the source node, and wherein the tree is pruned to deliver a flow-specific multicast tree.

14. A node in Segment Routing network comprising:

one or more ports;

forwarding circuitry communicatively coupled to the one or more ports; and control circuitry communicatively coupled to the one or more ports and the forwarding circuitry, wherein Segment Routing utilizes globally significant labels as node identifiers such that path state installation is only required at an ingress node of a Segment Routing domain;

wherein a multicast flow is advertised by a source node, wherein the control circuitry is configured to determine the node's role in the multicast locally based on the advertisement and to install appropriate forwarding behavior for the multicast flow based on a determined role, and wherein the node is a listener node in the multicast flow advertised by the source node, and wherein the control circuitry is configured to reciprocally flood a Segment Identifier (SID) to other nodes in the Segment Routing network.

15. The node of claim 14, wherein the advertisement utilizes Interior Gateway Protocol (IGP).

16. The node of claim 14, wherein, for the multicast flow, source node segments are used to construct source routed trees, wherein the source routed trees define broadcast paths.

17. The node of claim 14, wherein the multicast flow is assigned the Segment Identifier (SID).

18. The node of claim 14, wherein the determined role is one of a branch point for replication, a root, and a leaf.

19. The node of claim 14, wherein the multicast flow is a tree with a root at the source node, and wherein the tree is pruned to deliver a flow-specific multicast tree.

* * * * *